United States Patent [19]

Glotzback et al.

[11] Patent Number: 4,582,292
[45] Date of Patent: Apr. 15, 1986

[54] HOSE CLAMP

[75] Inventors: Lynn A. Glotzback, Elkhart, Ind.; James M. Trapp, Galien, Mich.

[73] Assignee: Elkhart Brass Manufacturing Co., Inc., Elkhart, Ind.

[21] Appl. No.: 505,373

[22] Filed: Jun. 16, 1983

[51] Int. Cl.⁴ .............................................. F16L 55/10
[52] U.S. Cl. ............................................ 251/9; 251/4
[58] Field of Search .................. 251/9, 4, 6, 7, 10, 251/107, 109; 24/130, 132 AA, 132 WL, 134 KB; 128/346

[56] References Cited

U.S. PATENT DOCUMENTS

| 788,603 | 5/1905 | Rowell | 251/9 |
| 2,009,907 | 7/1935 | Teuber | 251/9 |
| 2,250,122 | 7/1941 | Bjarnson | 251/9 |
| 2,746,064 | 5/1956 | Ausmuj | 251/9 |
| 2,825,525 | 3/1958 | Kellam | 251/9 |
| 3,171,184 | 3/1965 | Posse | 251/9 |
| 3,203,421 | 8/1965 | Bialick | 251/9 |
| 3,515,367 | 6/1970 | Ziaylek, Jr. | 251/9 |
| 3,713,622 | 1/1973 | Dinger | 251/10 |
| 3,874,042 | 4/1975 | Eddleman et al. | 251/10 |

Primary Examiner—Samuel Scott
Assistant Examiner—Helen Ann Odar
Attorney, Agent, or Firm—James D. Hall

[57] ABSTRACT

An improved clamp for a fire hose which includes beveled and grooved jaws to reduce the chance of the hose kicking out of the clamp when the clamp jaws are opened for recharging of the hose.

2 Claims, 6 Drawing Figures

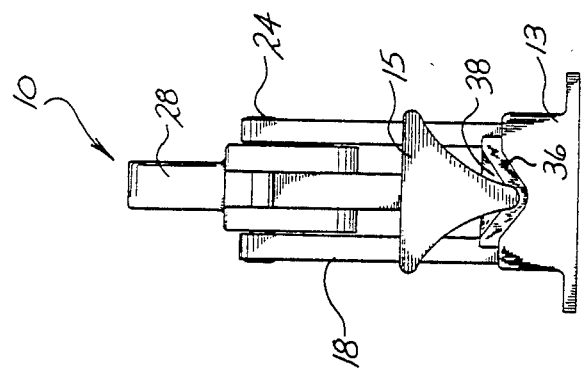
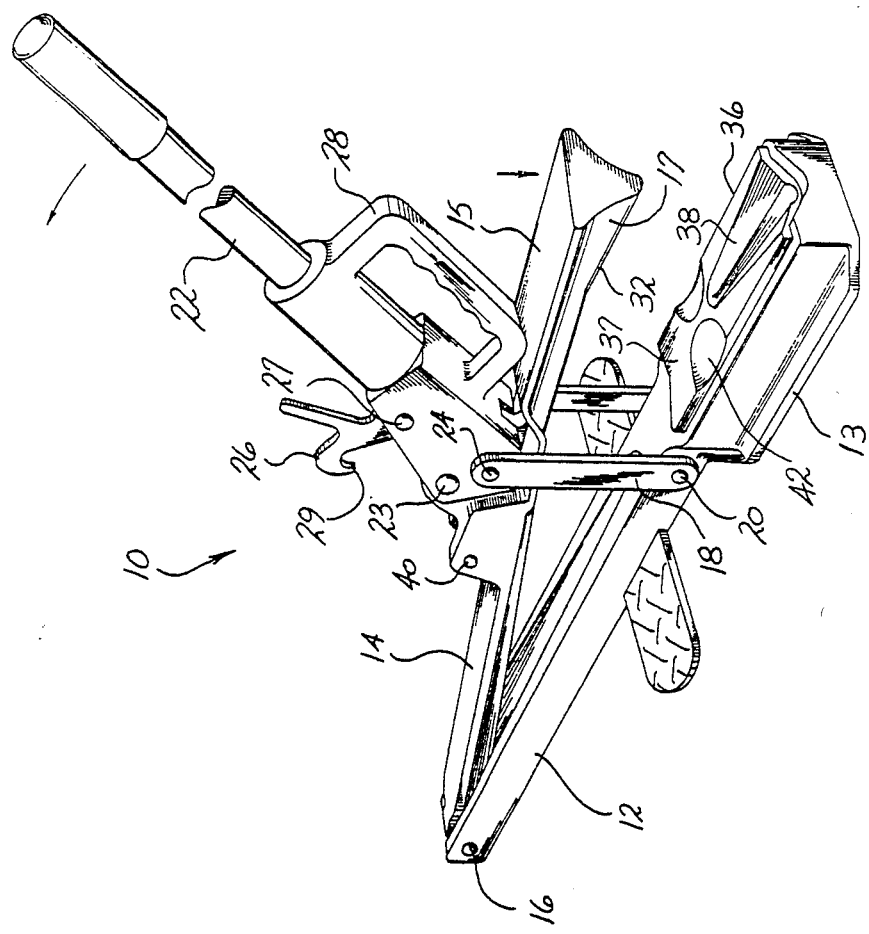

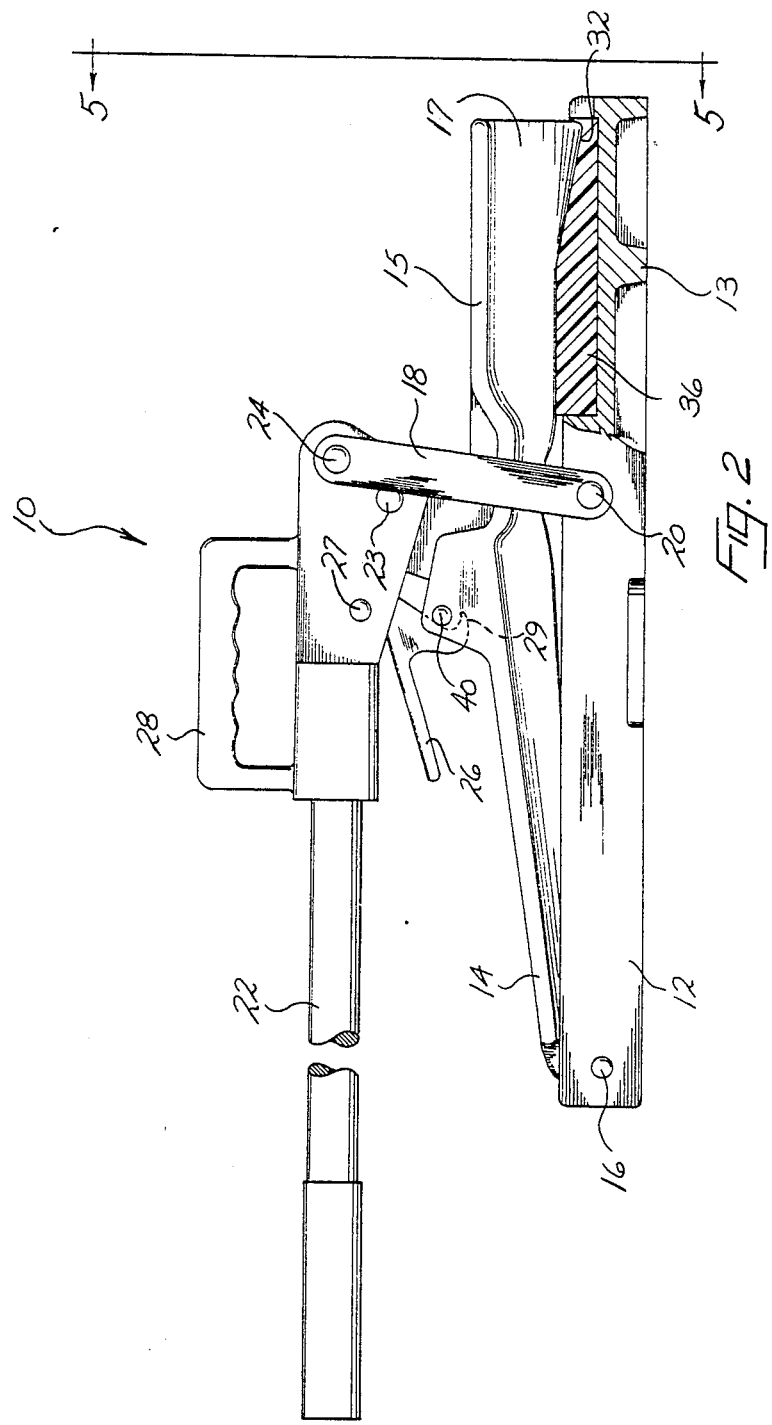

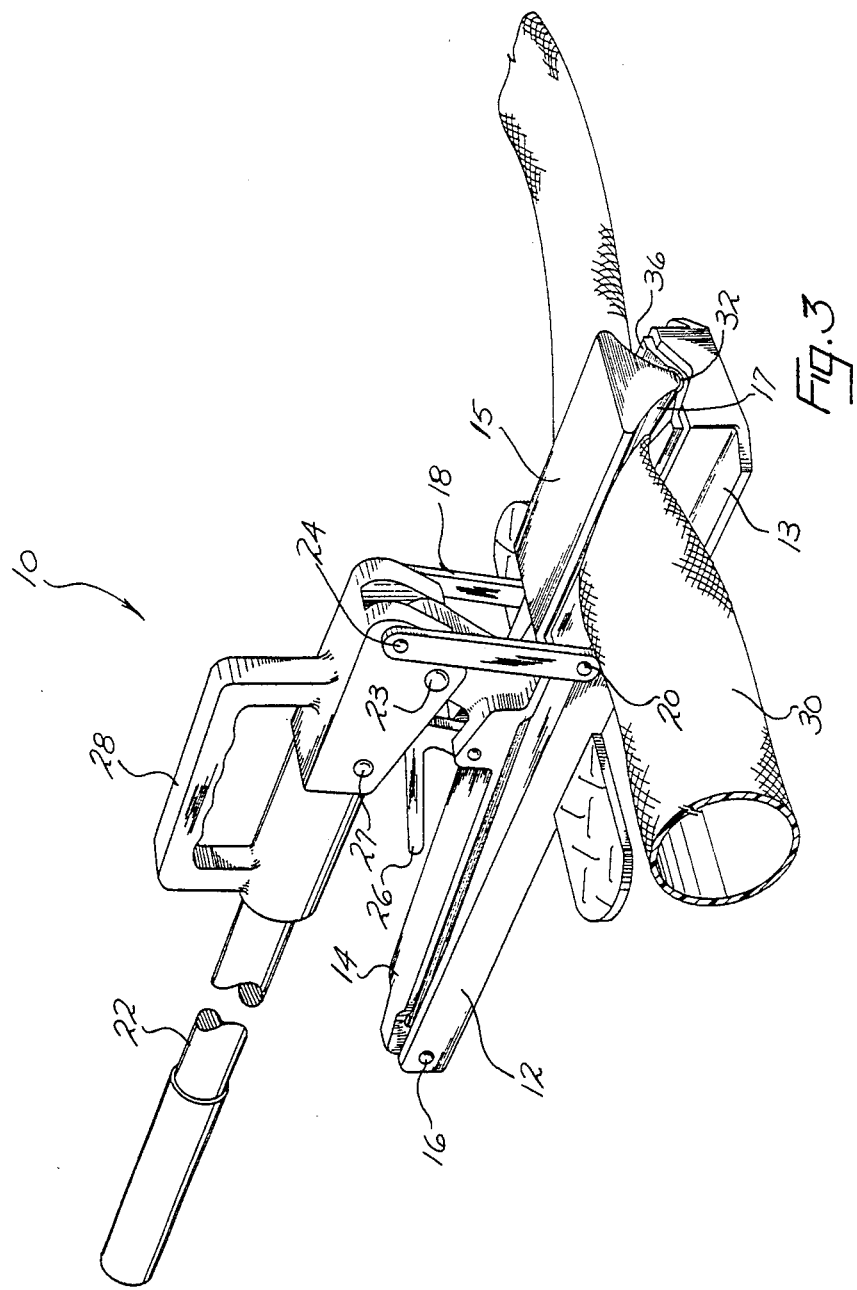

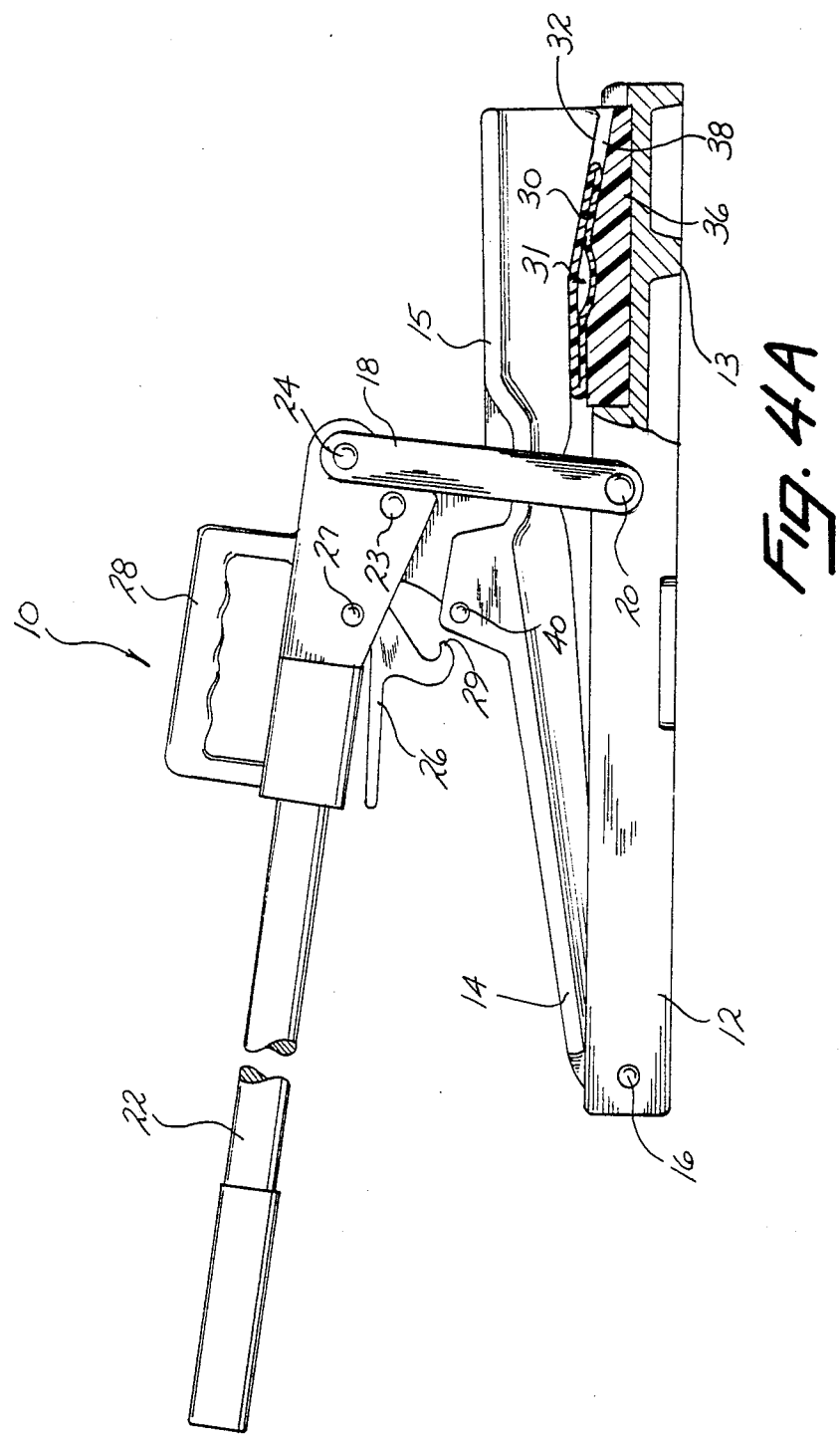

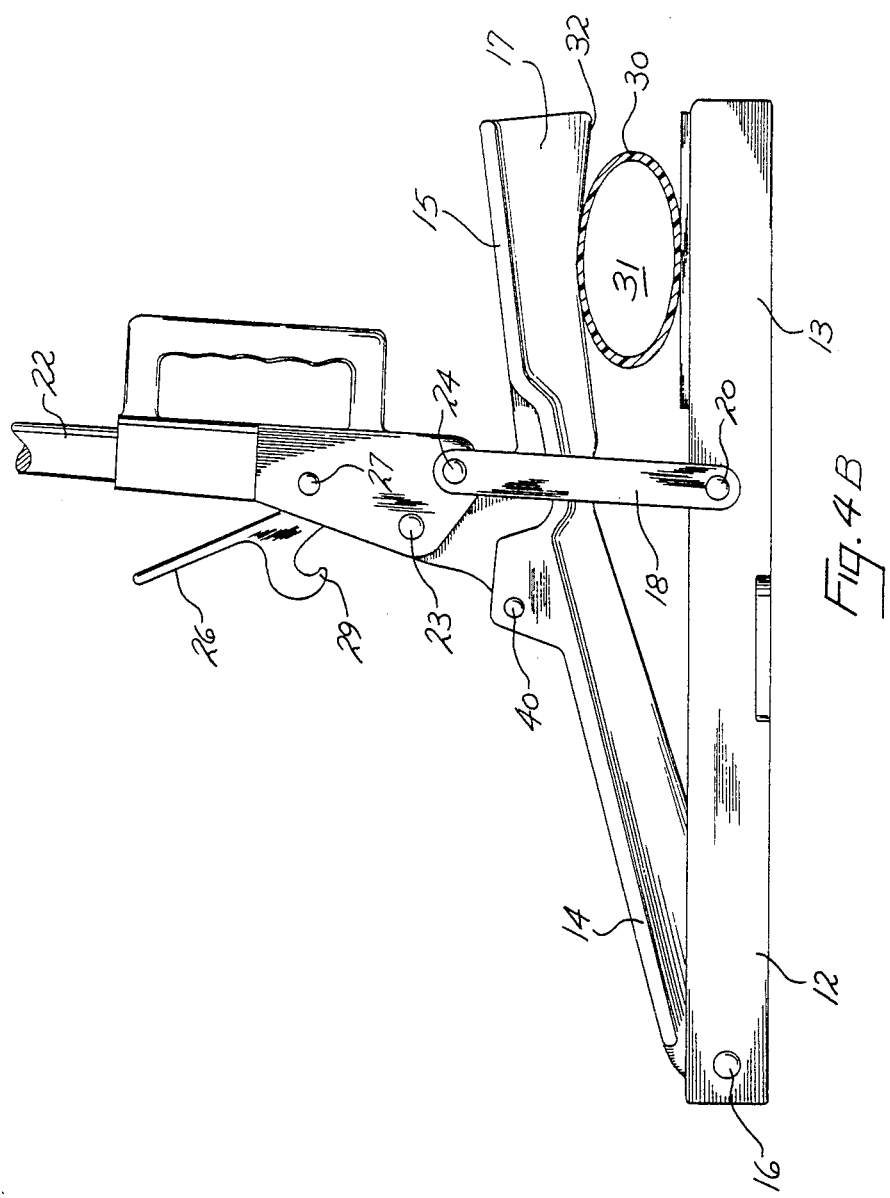

HOSE CLAMP

SUMMARY OF THE INVENTION

This invention relates to an improved clamp and will have special application to a clamp used to restrict fluid flow through a fire hose.

Heretofore, fire hose clamps included a pair of flat-edged jaws which when closed about a hose, restricted fluid flow therethrough. Such a clamp is disclosed in U.S. Pat. No. 3,460,797. When the jaws were opened, the sudden surge of fluid through the hose caused the hose to pop out of the clamp, creating a dangerous hose whipping surge situation.

The clamp of this invention includes a beveled jaw which significantly reduces the tendency of the hose popping out of the clamp. Also, a recess is cut into the other clamp jaw which allows the water to flow first in the middle of the hose upon opening of the jaws to further reduce the problem of hose kick out and surge.

Accordingly, it is an object of this invention to provide a novel clamp which is for stopping water flow through a fire hose.

Another object of this invention is to provide a fire hose clamp which reduces water surge and prevents the hose from kicking out of the clamp as the clamp is opened.

Other objects will become apparent upon a reading of the following description.

BRIEF DESCRIPTION OF THE DRAWINGS

A preferred embodiment has been chosen to illustrate the principles of the invention wherein:

FIG. 1 is a perspective view of the clamp showing the jaws thereof in their open position.

FIG. 2 is a longitudinal side view of the clamp with its jaws in their clamped position and having portions shown in section for purposes of illustration.

FIG. 3 is a perspective view of the clamp securing a fire hose therein.

FIG. 4A is a longitudinal side view of the clamp showing its jaws in a partial open position with the hose therein.

FIG. 4B is a view similar to FIG. 4A, but showing the jaws of the clamp in a half open position.

FIG. 5 is an end view of the clamp as seen from line 5—5 of FIG. 2.

DESCRIPTION OF THE PREFERRED EMBODIMENT

The preferred embodiment herein described is not intended to be exhaustive or to limit the invention to the precise form disclosed. It is chosen and described to best explain the principles of the invention, and its application and practical use to thereby enable others skilled in the art to utilize the invention.

As shown in the drawings, clamp 10 includes a base 12 and an arm 14. Arm 14 is pivotally attached to the rear of base 12 by a pivot pin 16. A handle 22 is pivotally connected by pin 23 to arm 14. A pair of links 18 are pivotally attached to the sides of base 12 by pivot pin 20 and extend upwardly from the base. Handle 22 is pivotally fastened by pin 24 to the upper ends of links 18. A catch 26 is connected by pin 27 to handle 22 and serves to lock arm 14 in its clamped position shown in FIGS. 2 and 3. A hand grip 28 is attached to handle 22 allowing carrying of clamp 10. The opposite ends of base 12 and arms 14 from pivot pin 16 form jaws 13 and 15, respectively.

The improved clamp of this invention serves to efficiently retain a hose 30 within its jaws 13,15 even when the jaws are partially opened as shown in FIG. 4. Arm jaw 15 has tapered sides 17 and includes a lower downwardly flared edge 32. As shown in FIGS. 1 and 2, jaw 13 includes an insert 36 which is grooved and includes a longitudinal downwardly flared recess 38, all longitudinally complemental with jaw 15. Jaw edge 32 and jaw recess 38 extend downwardly from the approximate longitudinal centers of their respective jaws 13 and 15. A transverse groove 42 in insert 36 interrupts the longitudinal groove 37 in the insert.

To operate clamp 10, hose 30 is placed between open jaws 13 and 15, and handle 22 is pivoted from its full open position shown in FIG. 1 into its closed position shown in FIG. 3 to enable the leading edge 29 of catch 26 to engage a lock pin 40 which extends through arm 14. Arm 14 is thus locked in its clamped position securing hose 30 centrally between jaws 13 and 15 with water flow through the hose being curtailed.

When it is desired to open or recharge hose 30, catch 26 is released from pin 40 upon slight depressive movement of handle 22 and the handle pivoted upwardedly to allow the controlled opening movement of jaw 15. The surge of water through hose 30 upon initial opening movement of jaw 15 will course generally through the hose center 31 due to the transverse groove 42 of jaw 13, as shown in FIG. 4A. This reduces the chance of the hose popping out from between the jaws 13,15. Further, due to the flared configuration of lower edge 32 of jaw 15, hose 30 will remain wedged between jaws 13 and 15 as shown in FIG. 4 until the jaws are fully opened and normal water flow courses through the hose. With clamp 10 constructed in this fashion, the water flow through hose 30 may be turned on and off without the problem of the hose kicking out from between the clamp jaws.

It is to be understood that the above description does not limit the invention which may be modified within the scope of the appended claims.

We claim:

1. A clamp for restricting fluid flow through a hose, said clamp including a base and an arm, said arm having first and second opposite ends, said arm pivotally connected at said first end to said base, said arm second end and said base forming first and second jaws, said jaws shiftable between a clamped position and an open position, and each having a hose contacting part terminating in a distal end, said jaws constituting means for preventing fluid flow through said hose when said hose is positioned therebetween and the jaws are in their said clamped position, and manually operated means for normally urging said jaws into their clamped position, the improvement wherein one of said jaws at its hose contacting part angles to its distal end toward the other of said jaws, said other jaw including a recess complemental to the angled hose contacting part of said one jaw, whereby said angled hose contacting part constitutes means for securing said hose between said jaws when said jaws are shifted toward their open position, said other jaw including a groove therein, said groove positioned substantially perpendicular to said jaw recess and constituting means for cradling said hose when positioned between said jaws.

2. The clamp of claim 1 and a lock means for securing said jaws in their said clamped position.

* * * * *